United States Patent
Xi et al.

(10) Patent No.: US 11,008,638 B2
(45) Date of Patent: May 18, 2021

(54) METHOD FOR SEPARATING NICKEL AND COBALT FROM A SOLUTION

(71) Applicant: Beijing University of Technology, Beijing (CN)

(72) Inventors: Xiaoli Xi, Beijing (CN); Zhengzheng Zhang, Beijing (CN); Liwen Ma, Beijing (CN); Zuoren Nie, Beijing (CN)

(73) Assignee: Beijing University of Technology, Beijing (CN)

( * ) Notice: Subject to any disclaimer, the term of this patent is extended or adjusted under 35 U.S.C. 154(b) by 0 days.

(21) Appl. No.: 16/713,921

(22) Filed: Dec. 13, 2019

(65) Prior Publication Data

US 2020/0115773 A1   Apr. 16, 2020

Related U.S. Application Data

(63) Continuation of application No. PCT/CN2018/076546, filed on Feb. 12, 2018.

(30) Foreign Application Priority Data

Jan. 10, 2018 (CN) .......................... 201810023464.2

(51) Int. Cl.
  *C22B 23/00* (2006.01)
  *C22B 3/00* (2006.01)
  *C22B 7/00* (2006.01)

(52) U.S. Cl.
  CPC .......... *C22B 23/0484* (2013.01); *C22B 7/007* (2013.01)

(58) Field of Classification Search
  CPC ... C22B 23/0484; C22B 7/007; C22B 3/0078; C22B 3/0067; C22B 3/0068; C22B 3/0012; Y02P 10/234; H01M 10/54; H01M 6/52
  See application file for complete search history.

(56) References Cited

U.S. PATENT DOCUMENTS

2017/0170532 A1* 6/2017 Blais .................. C22B 23/0423

FOREIGN PATENT DOCUMENTS

| CN | 100766766 A |   | 11/2012 |
|----|-------------|---|---------|
| CN | 103326088 A | * | 9/2013  |
| CN | 104120258 A |   | 10/2014 |
| CN | 105567978 A | * | 5/2016  |
| CN | 105789724 A |   | 7/2016  |
| CN | 106636637 A |   | 5/2017  |
| DE | 3411885 A1  |   | 10/1985 |

OTHER PUBLICATIONS (Kang, Jianzhuang et al.). "P204-N235 (Extraction Effect of Cobalt, Nickel and Magnesium from Water by Complex Extractant P204-N235)" (Journal of Nanchang Hangkong University (Natural Science Edition)), vol. 30, No. (04). pp. 65-69.

Liu et al, Separationof Cobalt and Nickel from Sulfate Media Using P507-N235 System, Separation Science and Technology, 2018, vol. 53, No. 1, pp. 36-43.

* cited by examiner

*Primary Examiner* — Steven J Bos
(74) *Attorney, Agent, or Firm* — Duane Morris LLP

(57) ABSTRACT

A method for separating nickel and cobalt from a solution includes the steps of: obtaining a solution containing nickel and cobalt by acid leaching of a cathode material of a waste lithium-ion battery, adjusting the pH of the solution containing nickel and cobalt to 3.5 to 4.5, adding extractants for extraction to separate the nickel and the cobalt. The cobalt enters the organic phase, the nickel remains in the aqueous phase, and the extractants contain an acidic extractant and an alkaline extractant. The method for efficiently separating nickel and cobalt through extraction adopts a non-saponification extraction method without using NaOH as a saponifier, thereby avoiding the discharge of saponification wastewater. Under acidic conditions, the cobalt in an acidic leaching solution is effectively extracted and separated into the organic phase through synergistic action of the acidic extractant and the alkaline extractant, thereby realizing the separation of nickel from cobalt.

8 Claims, No Drawings

METHOD FOR SEPARATING NICKEL AND COBALT FROM A SOLUTION

PRIORITY CLAIM AND CROSS-REFERENCE

The present application is a continuation of International Application No. PCT/CN2018/076546, filed on Feb. 12, 2018 and published as WO 2019/136792 A1 on Jul. 18, 2019, and which claims the benefit of Chinese Patent Application No. 201810023464.2, titled "A method for separating nickel and cobalt from a solution," filed on Jan. 10, 2018, which applications are expressly incorporated herein by reference in their entirety.

TECHNICAL FIELD

The present disclosure relates to the technical field of solid waste treatment, and in particular relates to a method for separating solid wastes containing nickel and cobalt.

BACKGROUND

At present, the extraction methods commonly used in the separation of nickel and cobalt mainly use acidic extractants. This kind of extractants are weakly acidic. The reaction process of this kind of extractants and nickel-cobalt elements is a cation exchange process, during which it is easy to cause an increase in the hydrogen ion concentration of the solution and thus an enhancement in the acid leaching, thereby affecting the extraction effect. Therefore, in the process of using such acidic extractants, the acidic extractants are often saponified using an alkaline liquid such as sodium hydroxide or ammonia water, so that the hydrogen ion in the hydroxyl group of the acidic extractant is replaced by the basic cation, and the basic cation is released into the aqueous solution when the extracting reaction occurs. Thus the hydrogen ions in the aqueous solution will not increase, the acidity of the solution will not be enhanced, and the extraction effect will not be affected. However, the use of NaOH as a saponifier is costly and the salt content of the saponified wastewater exceeds the standard. If the wastewater is discharged to the soil, the degree of salinization of the land will be aggravated. The cost of treatment with concentrated ammonia water is relatively low, but the ammonia nitrogen content in the wastewater will increase, and the discharged wastewater will seriously pollute the waterbody, thus greatly increasing the cost of treatment.

It is desirable to have non-saponification extraction and separation technology, which will solve the problems of ammonia nitrogen wastewater from the extracting procedure in the extraction and separation technology. Without the saponification procedure, on one hand, the process of extraction and separation can be shortened, the operation can be simplified, the alkali consumption can be reduced, and the cost can be saved; on the other hand, the production of wastewater such as ammonia nitrogen-containing wastewater can be avoided in the extracting procedure, thereby greatly reducing the discharge amount of wastewater.

SUMMARY

In view of the deficiencies in the art, the purpose of the present invention is to provide a method for separating nickel and cobalt from a solution.

The technical solution for achieving the purpose of the present invention is as follows:

A method for separating nickel and cobalt from a solution, comprising the steps of:

obtaining a solution containing nickel and cobalt by acid leaching of a cathode material of a waste lithium-ion battery, adjusting the pH of the solution containing nickel and cobalt to 3.5 to 4.5, adding extractants for extraction to separate nickel from cobalt, wherein the cobalt enters the organic phase, and the nickel remains in the aqueous phase. In the waste liquid solution, the content of nickel is 0.7 to 1.2 mol/L, the content of cobalt is 0.05 to 0.25 mol/L. The waste liquid solutions described herein may have a pH of less than 3.5, for example, less than 4. The pH can be adjusted using a base such as NaOH. In some other embodiments, the waste liquid solutions may have a pH of higher than 4.5, and an acid such as HCl can be used to adjust pH.

The extractants contain an acidic extractant and an alkaline extractant. In some embodiments, the acidic extractant is 2-ethylhexyl dihydrogen phosphate or 2-ethylhexylphosphonic acid mono-2-ethylhexyl ester. The alkaline extractant may be an organic amine with alkyl groups having $C_8$, $C_9$, $C_{10}$, or a combination thereof, or a mixture thereof. For example, the alkaline extractant is tri-octyl decyl amine in some embodiments.

In some embodiments, the solution containing nickel and cobalt further contains chloride ions, and the concentration of the chloride ions is 3 to 3.5 mol/L.

In some embodiments, the reagent for adjusting the pH of the solution is sodium hydroxide and/or hydrochloric acid.

In some embodiments, in the extractants, the volume ratio of the acidic extractant to the alkaline extractant is (1-9):(9-1).

Preferably, in the extractants, the volume ratio of the acidic extractant to the alkaline extractant is (2-4):(6-8).

In some embodiments, the extractants further comprise a diluent, the diluent is kerosene or sulfonated kerosene, and the volume ratio of the sum of the two extractants to the diluent is 1:(2-4).

In some embodiments, the volume ratio of the extractants to the solution is (3-5):1.

Furthermore, after adding the extractants for extraction, shaking the mixture, standing for 8 to 15 min, and separating the organic phase from the aqueous phase.

The beneficial effects of the present disclosure are as follows:

The method for efficiently separating nickel and cobalt through extraction provided by the present disclosure adopts a non-saponification extraction method without using NaOH as a saponifier, thereby avoiding the discharge of saponification wastewater. Under acidic conditions, the cobalt in an acidic leaching solution is effectively extracted into the organic phase through synergistic action of the acidic extractant and the alkaline extractant, thereby realizing the separation of nickel from cobalt.

DETAILED DESCRIPTION

For purposes of the description hereinafter, it is to be understood that the embodiments described below may assume alternative variations and embodiments. It is also to be understood that the specific articles, compositions, and/or processes described herein are exemplary and should not be considered as limiting.

The technical solution of the present invention will be described below by examples.

The extractants are two organic extractants including an acidic extractant and an alkaline extractant. In the following Examples, the exemplary acidic extractant is 2-ethylhexylphosphonic acid mono-2-ethylhexyl ester, having a code name "P507." The exemplary alkaline extractant is tri-octyl decyl amine having a code name "N235." The abbreviated code names are used for concise description only.

Example 1

The solution treated in this Example was a waste liquid containing cobalt and nickel elements, and was obtained by dissolving a cathode material of a lithium-ion battery with hydrochloric acid. In the solution, the content of nickel was 0.9 mol/L, and the content of cobalt was 0.15 mol/L. The concentration of hydrochloric acid may be in a suitable concentration, for example 0.01 mol/L to 0.1 mol/L, and the corresponding initial pH of the solution may be in a range of from 1 to 2.

The solution containing nickel and cobalt was allowed to perform extracting reaction with synergistic extractants, wherein the solution containing nickel and cobalt was adjusted to a pH of 4 with sodium hydroxide, and contained 3 mol/L of chlorine ions. Extractants, in which the volume ratio of P507 to N235 was 5:5 and the volume ratio of the two organic extractants to kerosene as a diluent was 1:2, were added to the solution, with the volume ratio of the extractants to the aqueous phase was 3:1. The resultant was shaken for extraction, and then allowed to stand for 10 min for layering. The lower aqueous phase was separated after the interface was clear. Cobalt mainly entered the organic phase with a distribution ratio of 2.4 (calculated based on cobalt).

The same volume of organic reagents P507 and N235 were taken, respectively, the solution containing nickel and cobalt was subjected to extraction and separation under the same conditions, and the resultant was allowed to stand for 10 min to achieve static layering. The lower aqueous phase was separated after the interface was clear, and the distribution ratios were 0.4 and 0.3, respectively.

The following formula was used to calculate the synergistic extraction coefficient:

synergistic extraction coefficient=distribution ratio using synergistic extractants/sum of distribution coefficient using only one extractant The synergistic extraction coefficient of this Example was 3.42.

Example 2

The solution containing nickel and cobalt was allowed to perform extracting reaction with synergistic extractants, wherein the content of nickel in the solution was 0.9 mol/L, the content of cobalt in the solution was 0.15 mol/L, the content of chloride ions in the solution was 3.2 mol/L, the solution containing nickel and cobalt was adjusted to a pH of 4 with sodium hydroxide, the volume ratio of P507 to N235 in the extractants was 3:7, the volume ratio of two extractants to kerosene as a diluent was 1:3, and the volume ratio of the extractants to the aqueous phase was 4:1. The mixture of the solution containing nickel and cobalt and the extractants were allowed to stand for 10 min for layering. The lower aqueous phase was separated after the interface was clear, and the distribution ratio was 11.8.

Organic reagents P507 and N235 were taken with the same volume, respectively, and used to extract the solution containing nickel and cobalt under the same conditions, and then the resultant was allowed to stand for 10 min for layering. The lower aqueous phase was separated after the interface was clear, and the distribution ratios were 0.64 and 0.48, respectively.

The synergistic extraction coefficient of this Example was 10.53.

Example 3

The solution containing nickel and cobalt was allowed to perform extracting reaction with synergistic extractants, wherein the content of nickel in the solution was 1 mol/L and the content of cobalt in the solution was 0.2 mol/L. The solution containing nickel and cobalt was adjusted to a pH of 4 with sodium hydroxide, and contained 3.5 mol/L of chloride ions. The volume ratio of P507 to N235 in the synergistic extractants was 2:8, the volume ratio of the organic extractants to kerosene was 1:4, and the volume ratio of the synergistic extractants to the aqueous phase was 3:1. The resultant was allowed to stand for 10 min for layering, and the lower aqueous phase was separated after the interface was clear. The distribution ratio was 7.3.

Organic reagents P507 and N235 were taken with the same volume, respectively, and used to extract the solution containing nickel and cobalt under the same conditions, and the resultant was allowed to stand for 10 min for layering. The lower aqueous phase was separated after the interface was clear, and the distribution ratios were 0.78 and 0.27, respectively.

The synergistic extraction coefficient of this Example was 6.95.

A person skilled in the art should know that the above Examples are merely illustrative of the preferred embodiments of the present invention, and are not intended to limit the scope of the present invention. Without departing from the design spirit of the present invention, various modifications and improvements made to the technical solution of the present invention shall fall within the scope of protection determined by the claims of the present invention.

What is claimed is:

1. A method for separating nickel and cobalt from a solution, comprising the steps of:
    obtaining a solution containing nickel and cobalt by acid leaching of a cathode material of a waste lithium-ion battery, wherein in the solution, a content of nickel is a range of from 0.7 mol/L to 1.2 mol/L, a content of cobalt is in a range of from 0.05 mol/L to 0.25 mol/L, and the solution further comprises chloride ions having a concentration in a range of from 2 mol/L to 3.5 mol/L;
    adjusting the pH of the solution containing nickel and cobalt to be in a range of from 3.5 to 4.5;
    adding extractants to the solution after the pH of the solution is adjusted so as to separate the nickel and the cobalt,
    wherein the cobalt enters an organic phase, and the nickel remains in an aqueous phase,
    wherein the extractants contain an acidic extractant and an alkaline extractant, and the acidic extractant is 2-ethylhexyl dihydrogen phosphate or 2-ethylhexylphosphonic acid mono-2-ethylhexyl ester, and the alkaline extractant is an organic amine with alkyl groups having $C_8$, $C_9$, $C_{10}$, or a combination thereof,
    wherein in the extractants, the volume ratio of the acidic extractant to the alkaline extractant is in a range of (2-4):(6-8).

2. The method according to claim 1, wherein a reagent for adjusting the pH of the solution is sodium hydroxide and/or hydrochloric acid.

3. The method according to claim 1, wherein the extractants further comprise a diluent, the diluent is kerosene or sulfonated kerosene, and the volume ratio of the sum of the two extractants to the diluent is 1:(2-4).

4. The method according to claim 1, wherein the volume ratio of the extractants to the solution is (3-5):1.

5. The method according to claim 1, wherein after the extractants for extraction are added, the resultant is shaken and allowed to stand for 8 to 15 min, and the organic phase is separated from the aqueous phase.

6. The method according to claim 1, wherein the acidic extractant is 2-ethylhexylphosphonic acid mono-2-ethylhexyl ester, and the alkaline extractant is tri-octyl decyl amine.

7. The method according to claim 2, wherein the volume ratio of the extractants to the solution is (3-5):1.

8. The method according to claim 2, wherein after the extractants for extraction are added, the resultant is shaken and allowed to stand for 8 to 15 min, and the organic phase is separated from the aqueous phase.

\* \* \* \* \*